Nov. 28, 1967 YOSHIRO TSUZUKI 3,355,137
MOLD FOR MANUFACTURING CONCRETE MEMBERS
HAVING CRUCIFORM CROSS SECTION
Filed Aug. 2, 1965 3 Sheets-Sheet 1

INVENTOR.
YOSHIRO TSUZUKI
BY
Bailey, Stephens + Huettig
ATTORNEYS

Nov. 28, 1967  YOSHIRO TSUZUKI  3,355,137
MOLD FOR MANUFACTURING CONCRETE MEMBERS
HAVING CRUCIFORM CROSS SECTION
Filed Aug. 2, 1965  3 Sheets-Sheet 2

INVENTOR.
YOSHIRO TSUZUKI
BY Bailey, Stephens + Huettig
ATTORNEYS

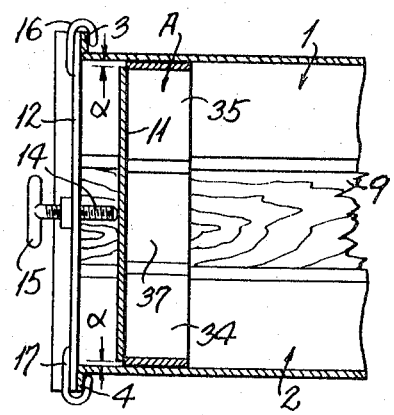
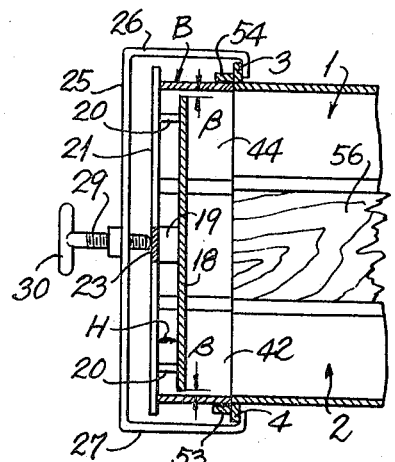
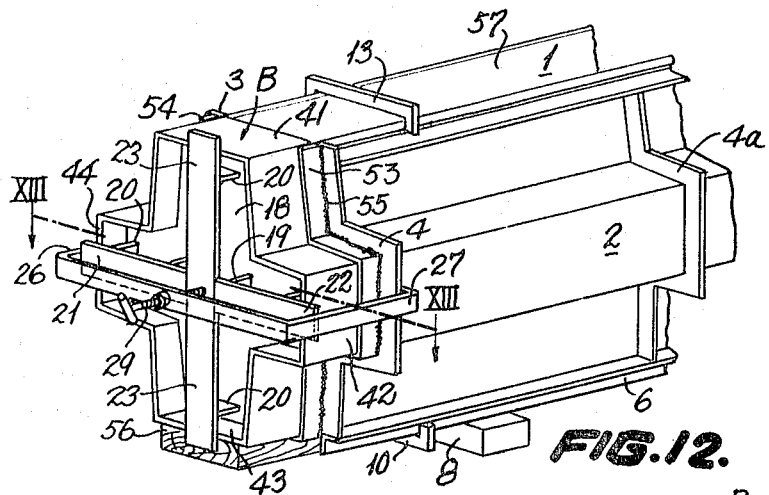
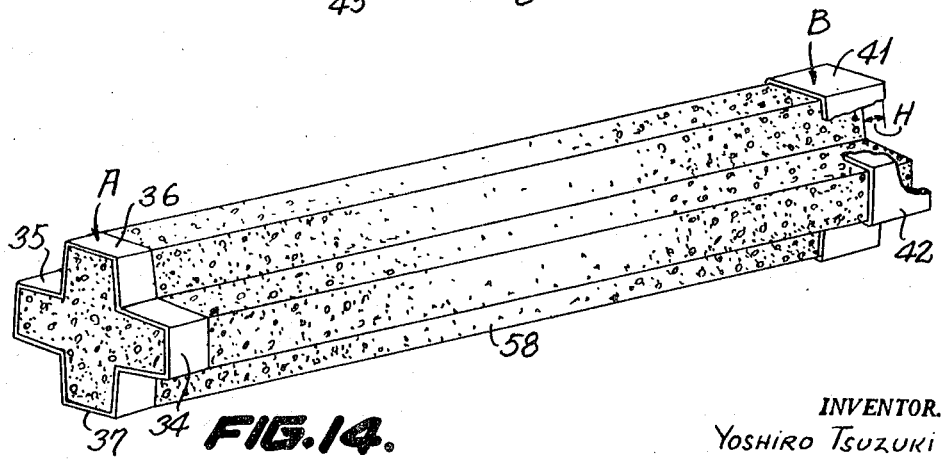

United States Patent Office 3,355,137
Patented Nov. 28, 1967

3,355,137
MOLD FOR MANUFACTURING CONCRETE MEMBERS HAVING CRUCIFORM CROSS SECTION
Yoshiro Tsuzuki, 2 of 76 Mitsukesoto, Hon-aza Deguchi-machi, Numazu, Shizuoka Prefecture, Japan
Filed Aug. 2, 1965, Ser. No. 476,577
Claims priority, application Japan, Aug. 3, 1964, 39/44,477
11 Claims. (Cl. 249—48)

The present invention relates to an apparatus of molding flasks for manufacturing concrete members having cruciform cross section.

The principal object of the present invention is to provide an apparatus of molding flasks for the manufacture of concrete members of cruciform or +-shaped cross sections which is simple in construction and can easily be handled with high efficiency.

Another object of the present invention is to provide an apparatus of molding flasks for the manufacture of concrete members of cruciform cross sections which can easily and rapidly be assembled and erected in a simple manner and reversely, can also simply be dismantled and disconnected with ease.

A further object of this invention is to provide an apparatus of molding flasks for the manufacture of concrete members of cruciform cross sections which enables to manufacture a concrete member with or without male and female joint fittings in an economical manner with high efficiency.

Other objects and advantageous features will become apparent as the description proceeds.

In the conventional known apparatuses for the manufacture of concrete members or bodies, it has been customary to form a matrix by securing both right and left side upper molding flasks or forming frames at their bottom ends to the upper surface of a lower molding flask having a closed bottom by means of a large number of bolts. However, in constitution of such a matrix, it requires not only a long time and troublesome laboriousness for the bolting, but also there is a danger that a cement paste of the charged concrete leaks out sometimes from imperfect bolted parts. Moreover, after the manufacture of the desired concrete member, it requires an extremely long time and complicated trouble for the upper molding flasks and the lower molding flask to be disassembled and removed from the finished concrete member. That is, in unbolting and disassembling the upper molding flasks from the lower molding flask a long time and troublesome laboriousness are needed and furthermore, at the time when the lower molding flask is to be removed from the finished concrete member at an initial hardening of the concrete, the said lower molding flask must first be turned upside down or inverted in intact state and then the lower molding flask must be removed, but such an operation requires a considerable long time and heavy labor. Moreover, when the lower molding flask is inverted, there occurs concentrately undesirable stress in the mold itself to give rise to cracks on the mold, and at the same time, an initial load is given to the concrete member, and as a result thereof, not only cracks are produced on said concrete, but also the bond between the steel bars and the concrete is weakened due to the above-mentioned inversion.

On the other hand, in the conventional usual molding flasks for the manufacture of concrete members, it is a practice to watertightly close the both front and rear open ends of a matrix by means of closure plates for the purpose of preventing the leakage of a cement paste of the concrete. However, when the both open ends of the matrix are obturated watertightly with closure plates as described above, the cement paste is suspended in the concrete and does not sufficiently travel about in the concrete, so that it does not satisfactorily reach to the closure plates and the joint fittings, and as a result thereof, not only the concrete member having the satisfactory high impact resistance cannot be obtained, but also no close junction between the joint fittings and the concrete is obtained, because the cement paste does not effectively travel throughout the concrete or does not exert on the contact surface of the inner peripheral surface of the joint fittings and the concrete. Accordingly, the concrete member thus obtained has a weak point in this contact surface. In addition, it is very difficult to remove the closure plates from the matrix after the completion of the work.

The present invention is improved to overcome these defects and disadvantages inherent in the conventional known molding flasks as described above, and characterized in that (1) an assembled molding flask of

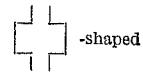 -shaped cross section is constituted by vertically arranging a molding flask of

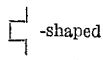 -shaped cross section formed of a thin sheet iron plate or a synthetic resin plate and a molding flask of

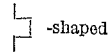 -shaped cross section formed similarly of a thin sheet iron plate or a synthetic resin plate, in opposite and in parallel in spaced relation with each other; each bottom portion of both the molding flasks of

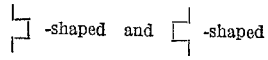

is abutted against or brought into contact with both sides of a wooden bottom plate having the desired width, thickness and length and previously disposed in horizontal; the wooden plate is tightly fastened together with the said bottom portions of the molding flask from outside by means of clamping devices to form a matrix of

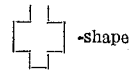 -shape and thereafter, closure plates of cruciform sheet iron plates each slightly smaller in shape than the configuration along the inner periphery of both front and rear open ends of the matrix are inserted loosely into the said both front and rear open ends respectively and positioned therein by means of a suitable fastening and fixing device or means respectively, and that (2) desired male joint fittings of

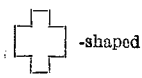 -shaped cross section and desired female joint fittings of

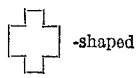 -shaped cross section are placed respectively in the predetermined position in the interior of the both front and rear open ends of the said matrix of

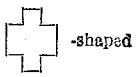 -shaped cross section and then connected with each other by arrangement of reinforcement; and a front closure plate of cruciform sheet iron plate, which is in shape slightly smaller than the configuration along the inner peripheral surface of the matrix of

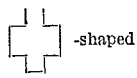 -shaped and a rear closure plate of cruciform sheet iron plate, which is in shape slightly smaller than the configuration along the inner peripheral surface of the said matrix are respectively inserted into the matrix and the female joint fittings and positioned therein by means of suitable fastening and fixing device and fastening and fixing means respectively. In the above-mentioned both cases (1) and (2), there is respectively provided a slight clearance between the inner peripheral surface of the front and rear open ends of the matrix and the outer periphery of said closure plates in the former case (1) or between the inner peripheral surface of the matrix and the female joint fittings and the outer periphery of said closure plates in the latter case (2).

As described above, in the present invention, the bottom portion of the molding flask of

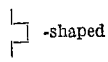 -shaped cross section and the bottom portion of the other molding flask of

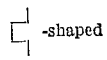 -shaped cross section are respectively brought into contact with the both side surfaces of the wooden bottom plate, and this bottom plate is then fastened together tightly with the said bottom portions of the molding flasks by means of suitable clamping devices from outside. Thus, the firm and strong connection of the bottom plate and the bottom portions of the molding flasks is obtained in a simple manner and moreover, there is no fear that the cement paste will leak out from these bottom junction parts.

On the other hand, in the present invention, the both front and rear open ends of the matrix of

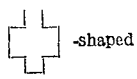 -shaped cross section, or the male and female joint fittings respectively inserted into the said front and rear ends of the said matrix are loosely obturated respectively with the predetermined closure plates of cruciform sheet iron plate and positioned therein by means of a suitable fastening and fixing device or means in such a manner that there is respectively provided a slight clearance between the inner peripheral surface of the open ends of the matrix and the outer periphery of the closure plates, or between the inner peripheral surface of the matrix and the female joint fittings inserted into the rear open end of the matrix and the outer periphery of the closure plates, and consequently, the cement paste of concrete charged in the matrix can leak out through these clearances. In the present invention, these clearances are designed to be about 2 to 4 mm., preferably about 2.5 to 3 mm. in consideration of the leakage of the cement paste.

Since the above-mentioned clearance is slight as described above but it is sufficient for a part of the cement paste to leak out through the clearance, and the amount of cement paste to be leaked out is small correspondingly. Thus, the cement paste of the concrete charged into the matrix is able freely to travel throughout the concrete, at which time a part of the cement paste is able to leak out through the said clearance, but the amount of the paste to be leaked out is in a slight amount and the flow of the paste leaked out through the clearance will spontaneously begin to solidify and stop after a short time, while at the time when the paste leaks out through the clearance, another part of the paste reaches to the closure plates or the inner peripheral surface of the male and female joint fittings at the both ends of the matrix.

As can be seen from the above description, according to the present invention, a concrete member with or without the male and female joint fittings at the both ends can be manufactured in compliance with the request.

Furthermore, it should be noted that when a metallic bottom plate such as iron bottom plate is used in place of the aforesaid wooden bottom plate, there is a danger that the cement paste will leak out from the juncture of the bottom plate and the said bottom portions, because no satisfactory junction of the bottom portions of both molding flasks of

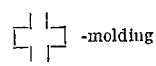 -molding flask and the bottom metallic plate is obtained. This is the reason why the wooden bottom plate is selected in this invention.

As heretofore mentioned, the clearances between the inner peripheral surface of the front and rear open ends of the matrix and the outer periphery of the closure plates, or the inner peripheral surfaces of matrix and the female joint fittings and the outer periphery of the closure plates are adapted to leak out the cement paste all along the periphery of the closure plates of cruciform iron plate, and consequently, these closure plates must be removed from the matrix before the initial hardening of the cement paste leaking out all along their periphery. By removal of the closure plates prior to the initial hardening of cement paste, it is possible to release the closure plates from the concrete layer rapidly with ease and to make the removal of the closure plates easy.

The closure plates to be removed from the molding flasks before the initial hardening of cement paste may be removed after concrete formation as, for example, after two hours or so, so that the closure plates can be used reciprocally in several times during the operation in a day, which results in great economy. Further, by premature removal of the closure plates at the open portions on the front and the rear ends, it is also possible to sufficiently dissipate moisture generated from the concrete charged through the open portion at the top of the matrix and carry out the air curing of concrete form in the matrix very quickly and efficiently. Consequently, there is obtained more efficient hardening.

For a better understanding of the invention, reference will now be made, by way of example, to the accompanying drawings, in which:

FIG. 1 is a perspective view showing one molding flask formed of a thin iron plate or a synthetic resin plate bent in a

 -shape its bottom part being formed in vertical shape;

FIG. 2 is a perspective view of another molding flask formed of a plate similarly bent in a

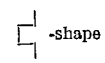 -shape its bottom part being formed in vertical shape;

FIG. 3 is a perspective view showing condition of a molding flask of the

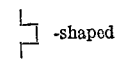 -shaped cross section reinforced by reinforcing members of

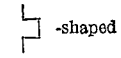 -shaped shape steel at both front and rear ends and in the middle of the said molding flask;

FIG. 4 shows an elevational front view of a 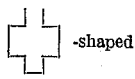 -shaped matrix having reinforcing members of 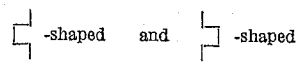 shape steels respectively fixed to the front end of the molding flask of the  -shaped cross section and that of the 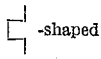 -shaped cross section, bottom portions of said molding flasks being abutted against both sides of a wooden bottom plate and fastened together tightly therewith by means of a clamping device;

Figure 4:
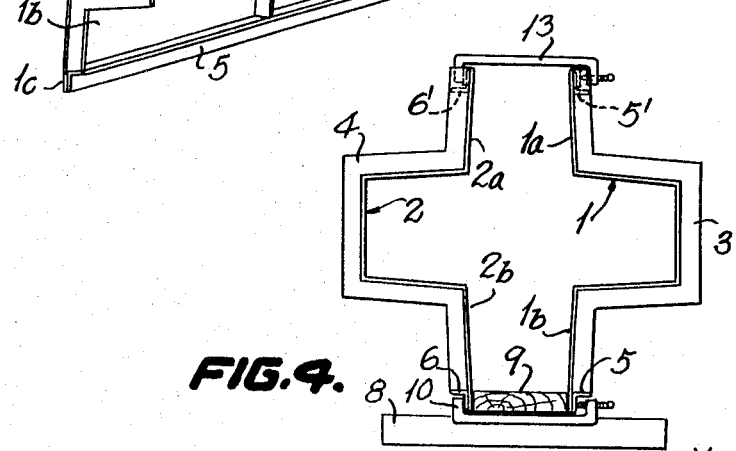
Figure 5:
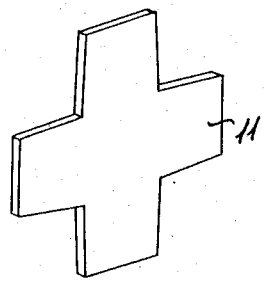
FIG. 5 is a perspective view of a front closure plate of cruciform sheet iron plate for supporting the concrete in the matrix at its front open end.
Figure 7:
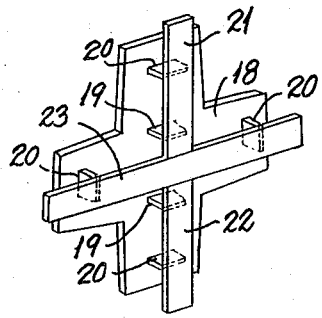
FIG. 7 is a perspective view of a rear closure plate of cruciform sheet iron plate for supporting the concrete in the matrix at its rear open end.
Figure 6:
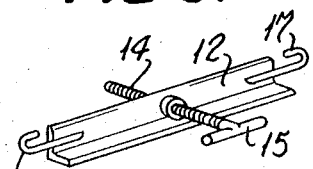
FIG. 6 is a perspective view of front fastening and fixing device pressing against the front closure plate shown in FIG. 5 from front side and holding it fixedly.
Figure 8:
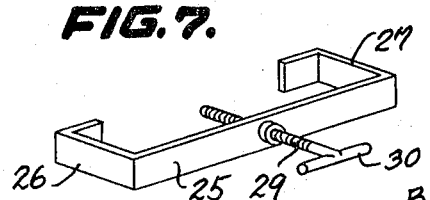
FIG. 8 is a perspective view of rear fastening and fixing means pressing against the rear closure plate shown in FIG. 7 from rear side and holding it fixedly.
Figure 9:
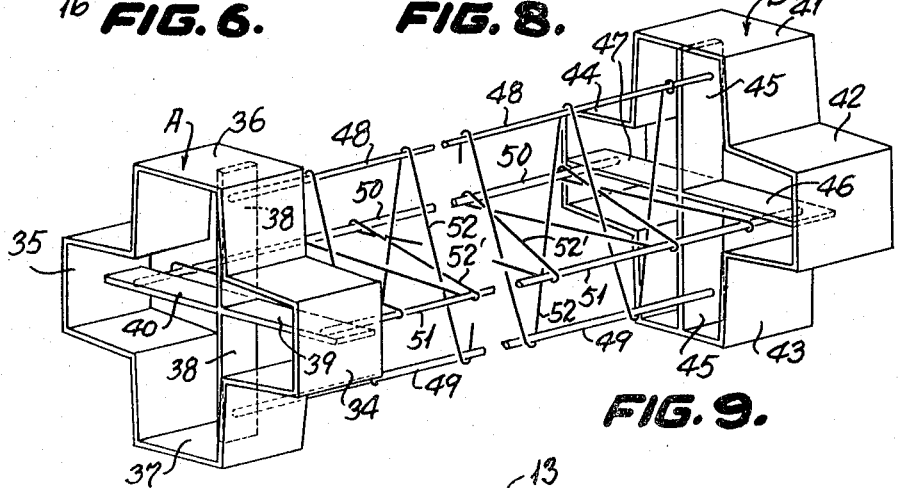
Figure 10:
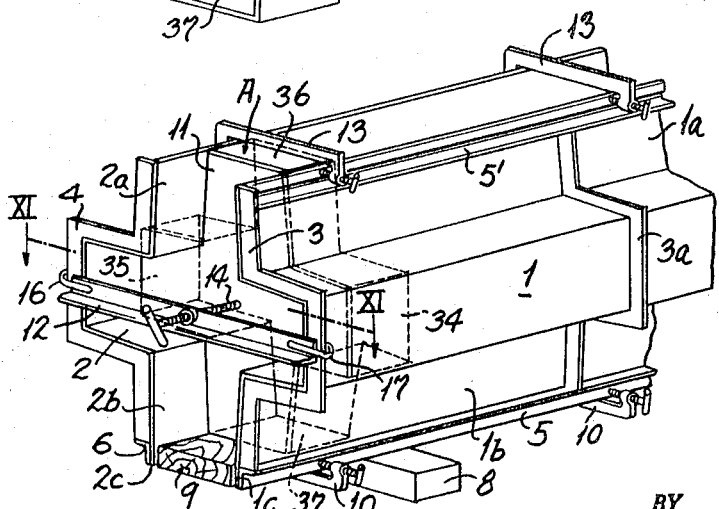

FIG. 9 shows an instance of the connection of male and female joint fittings for use in manufacturing concrete member fitted at its front and rear ends with the male and female joint fittings respectively, and is a perspective view partially cut-away showing male joint fittings having a 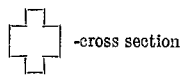 -cross section and fitted at the front end (as shown in the drawing) of the concrete member to be manufactured and female joint fittings having a 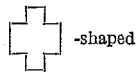 -shaped cross section and fitted at its rear end of the concrete member, which are connected together with each other by longitudinal steel bars and arranged with spiral hoop small bars respectively;

FIG. 10 is a partial perspective view showing insertion of the male joint fittings have a 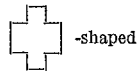 -shaped cross section fitted into the front end of the matrix, and engaging with the front cruciform closure plate and the front fastening and fixing device shown in FIGS. 5 and 6, provided that the bar arrangement is not shown;

FIG. 11 shows a partial horizontal sectional view taken on the line XI—XI of FIG. 10, looking in the direction of the arrows, with the bar arrangement not shown;

FIG. 12 is a partial perspective view showing a condition wherein the female joint fittings of 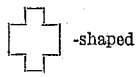 -shaped cross section as shown in FIG. 9 are fitted into the rear open end of the matrix constructed as shown in FIG. 4 and the rear cruciform closure plate is fixed through the rear fastening and fixing means shown in FIGS. 7 and 8, wherein the bar arrangement is not shown;

FIG. 13 shows a partial horizontal sectional view taken on the line XIII—XIII of FIG. 12, looking in the direction of the arrows, wherein the bar arrangement is not shown;

FIG. 14 is a perspective view of finished concrete member manufactured on the basis of one embodiment of the molding flask according to this invention, which is fitted with male joint fittings on its front end and female joint fittings on its rear end.

Figure 1:
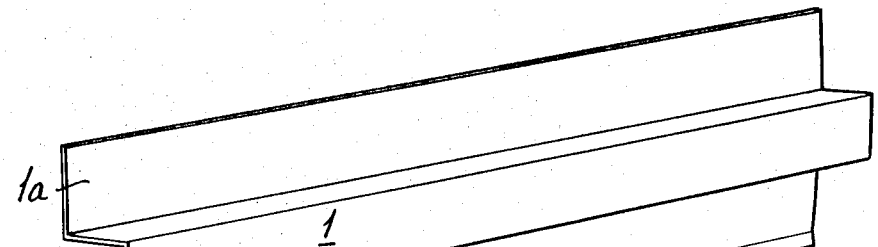
Figure 2:
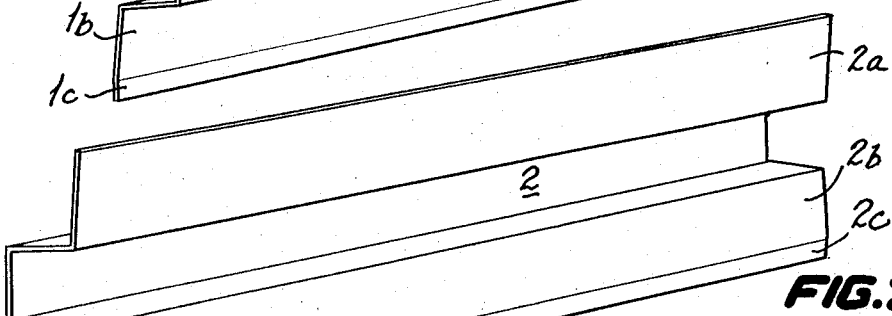
Figure 3:
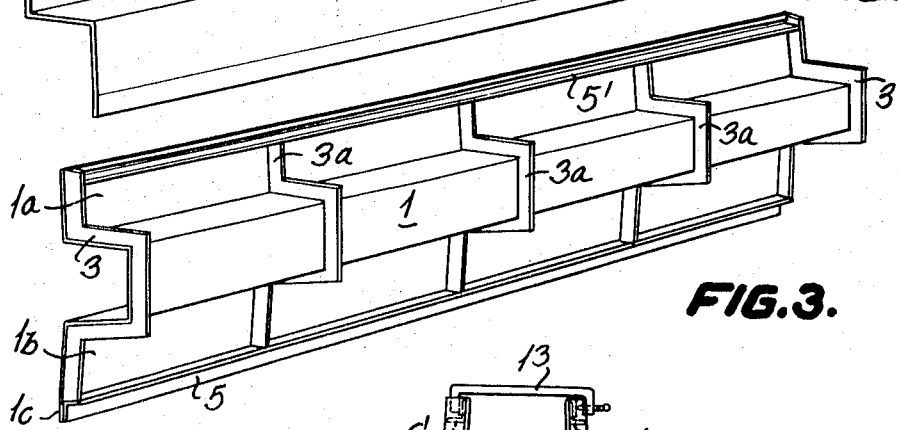

In FIGS. 1 and 2, 1 and 2 indicate the molding flasks formed by respectively bending plates of thin sheet iron or synthetic resin such as vinyl resin into 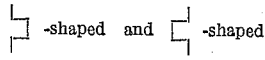 cross sections, in which 1a, 1b and 2a, 2b show upper and lower leg portions of the bent molding flask, the upper and lower leg portions 1a and 1b incline somewhat inwardly, and the upper and lower leg portions 2a and 2b incline similarly somewhat inwardly. 1c and 2c are vertical parts of the bottom ends of both molding flasks 1 and 2 adapted to hold closely a wooden bottom plate 9 disposed in horizontal and having the predetermined width, thickness and length between the bottom portions of the molding flasks 1 and 2. Further, the upper ends of these two molding flasks 1 and 2 are bent outwards so as to hold each one leg portion of the angle bars 5, 5', 6 and 6' each having ⌈-shaped, ⌊-shaped, ⌉-shaped and ⌋-shaped cross sections. 3 and 4 are reinforcing members made of 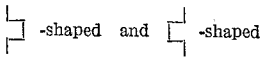 shape steels respectively secured by welding or other method to the front and rear end of the molding flasks 1 and 2; and 3a and 4a (see FIG. 12) are reinforcing members made of similarly 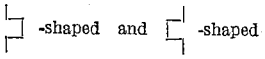 shape steel and these reinforcing members are fixed on the molding flasks 1 and 2 respectively between said reinforcing members 3 and 3, and 4 and 4. Said reinforcing members 3, 3a, and 4, 4a can be substituted by the angles for the flat shape steels. 5 and 6 are ⌈-shaped and ⌉-shaped angles respectively welded to the back of the vertical parts 1c and 2c of the bottom ends of the 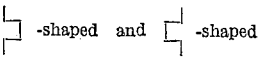 molding flasks, the upper end surface of which are respectively welded to the bottom end surfaces of the reinforcing members 3, 3 and 4, 4 (see FIG. 12) of 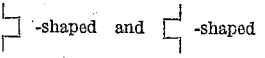 shape steel. As heretofore mentioned, the molding flask 1 of the 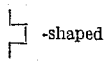 -shaped cross section strengthened or reinforced by the reinforcing members 3 and 3a and the molding flask 2 of the 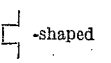 -shaped cross section fixed similarly with the reinforcing members 4 and 4a are arranged in parallel and in opposite in spaced relation with each other to form a molding flask of a 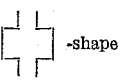 -shape and the said vertical bottom parts 1c and 2c of both molding flasks 1 and 2 are abutted against or brought into close contact with both sides of the wooden bottom plate 9 located on the support member 8 and fastened together tightly from outward by clamping device 10 such as, for example, a vice through the said angles 5 and 6, whereby said bottom plate is held closely between the bottom portions of both molding flasks 1 and 2 to form a matrix of

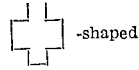 -shaped cross section, thereby, firm and right conjunction is provided between the said both bottom parts and the both sides of the wooden bottom plate and at the same time, the molding flask 1 of

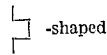 -shaped cross section and the molding flask 2 of

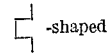 -shaped cross section are erected vertically. 11 is a front closure plate made of cruciform sheet iron plate. This closure plate is dimensioned so as to be loosely inserted into the front end opening of the matrix of

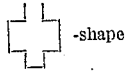 -shape in the case of the manufacture of concrete member without joint fittings, or to engage with the outer end surface of the male joint fittings in the case when the manufacture of a concrete member fitted on its front and rear end respectively with male and female joint fittings is intended and the male joint fittings have been fitted into the front open end of the matrix, and after having been inserted into the said front end opening or engaged the male joint fittings, the front closure plate is fixed in the desired position by pressing of the tip end of the bolt 14 against the face of the said closure plate 11 by bolting 14 the front fastening and fixing device 12 with a handle 15, in which case the device body itself abuts the outer end surface of the front open end of the matrix, and holders 16 and 17 welded or secured to both ends of the device body itself engage and embrace the leg portions of the

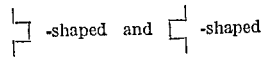

reinforcing members 3 and 4, and at the same time, said closure plate engages with the outer end surface of the male joint fittings, but this engagement between the outer end surface of said joint fittings and the peripheral edge portion of the fixed closure plate 11 is not so firm and is in such a degree that cement paste, particularly dilute cement paste of the concrete can exude or leak out between the said engaging parts. 13 is a clamping means for maintaining the top opening of the matrix in regular spacing. 18 is a rear closure plate made of cruciform flat iron and has the same functions and effects as is the case with the aforesaid front closure plate 12. This closure plate 18 is also dimensioned so as to be loosely inserted into the rear open end or female joint fittings of

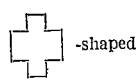 -shaped cross section from its rear open end and has been connected securely with a cruciform engaging member formed by welding each end side of sheet iron plates 21 and 22 respectively to both sides of a long iron plate 23 through the distance pieces 19 and 20 (the height of which is shown by H) which respectively have been welded to the closure plate 18 at its center part and arms 21, 22, 23 and 23 on one hand and welded correspondingly to the back side of said cruciform engaging member on the other hand. This closure plate 18 is fixed in the desired position by pressing of the tip end of the fastening rod 29 against the face of said cruciform engaging member 25 by turning of the fastening rod 29 of the said engaging member 25, with the handle 30, in which case the engaging arms 26 and 27 at both ends of the fastening and fixing means 25 engage respectively the back side of the

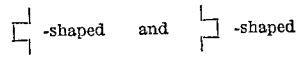

reinforcing members 3 and 4 at the rear end and hold tightly the said reinforcing members. The front closure plate 11 of cruciform flat iron engaging with the outer surface end of the male joint fittings provides a clearance α between the inner surface of the matrix and the outer periphery of the front closure plate 11 as shown in FIG. 11, and similarly the rear closure plate 18 of cruciform sheet iron provides, as shown in FIG. 13, a clearance β between its outer periphery and the inner peripheral surface of the joint fittings or the female joint fittings B of

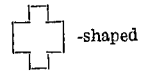 -shaped cross section arranged outside of the rear open end of the matrix of

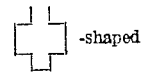 -shaped cross section, thereby the cement paste of concrete filled in the matrix of

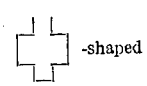 -shaped cross section is enabled to be leaked out from the said clearances α and β. In the present invention, the abovementioned clearances α and β are designed to be about 2 to 4 mm., preferably 2.5 to 3 mm. in consideration of the leakage of the cement paste. The clearances for the leaking of this cement paste extremely simplify the operation of insertion and removal of the said closure plates 11 and 18 from both front and rear open ends so that the assembling oi the matrix of

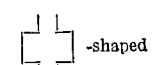 -shaped cross section is very easy and at the same time the disassembling of the molding flasks are considerably facilitated.

Furthermore, a cement paste, particularly a dilute cement paste in the concrete exudes out the engaging parts of the outer end surface of the male joint fittings A and the outer peripheral edge portion of the front closure plate 11 and then leaks out through the clearance α, as heretobefore set forth.

Reverting now to the drawings, the male joint fittings A to be fitted into the front open end in the case of the manufacture of the produced concrete member such as shown by 58 in FIG. 14 is formed into a

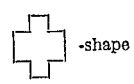 -shape by welding of four ⊐-shaped profiles 34, 35, 36 and 37 together integrally and the female joint fittings B to be fitted into the rear end of the produced concrete member is similarly formed into a

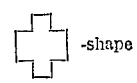 -shape by welding four ⊐-shaped profiles 41, 42, 43 and 44 together integrally, and the sizes of the said

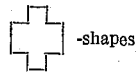 -shapes are different from each other, the size for the female joint fittings B being slightly larger than that for male joint fittings A and dimensioned so as to be able to fit the joint fittings A inside the joint fittings B closely in contact. The male joint fittings A thus formed are fitted in the front end of the matrix from front open end, while the female joint fittings B are fitted in holding means (53, 54) of

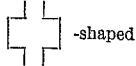 -shaped cross section welded at one side to the rear

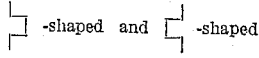

reinforcing members 3 and 4 secured to the rear open end of the matrix, and positioned therein.

Furthermore, it is apparent that the formation of the said joint fittings A and B of

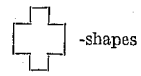 -shapes may be modified as occasion demands, and that in the case where the concrete member without male and female joint fittings is manufactured, there is no necessity for such male and female joint fittings.

After the desired male and female joint fittings A and B have respectively been positioned in the predetermined positions at the front and rear ends of the matrix, the arrangement of the desired reinforcement is carried out. However, the positioning of the joint fittings A and B and the arrangement of reinforcement may also be carried out in parallel, if required.

Inside the joint fittings A there is welded a cruciform support formed by welding sheet iron piece 39 and 40 to both sides of a long sheet iron piece 38, and inside the joint fittings B there is welded a cruciform support formed by welding sheet iron pieces 46 and 47 to both sides of a long sheet iron piece 45 in the similar manner. Both ends of longitudinal reinforcing bars are welded to these two cruciform supports, in which arrangement the two sets of bars 48, 49 and bars 50, 51 corresponding to the longitudinal iron bars 48, 49, 50 and 51 on the upper and lower and on the left and right, each end of which is welded to each of support arms 38, 39, and 40 on the upper and lower and the left and right of one cruciform support, are respectively passed through corresponding spiral hoop small bars 52 and 52' and then other ends of said longitudinal bars and welded respectively to the support arms 45, 45, 46, and 47 of other rear cruciform supports. Thereafter, these spiral hoop small bars are pulled and extended on sets of the longitudinal bars respectively. Thereby are obtained male and female joint fittings A and B respectively having a bar arrangement as desired (see FIG. 9).

After the positioning of the male and female joint fittings A and B in the matrix and the arrangement of reinforcement have been finished in the manufacture of concrete member with joint fittings, the front closure plate 11 is inserted loosely from the open end of the matrix and abutted against the outer end surface of said joint fitting A, and thereafter the

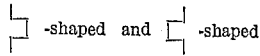

reinforcing members 3 and 4 respectively on the front open end of the matrix are embraced by both holding pieces 16 and 17 of the front fastening and fixing device 12 whereby the front closure plate 11 is fixed securely by bolting 14 as described above (see FIG. 10). The joint fittings B are fitted from rear end side in the holding means (53, 54) of

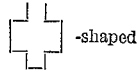 -shaped cross section which have been welded previously at 54 and 55 to the inner side of each of the reinforcing members 3 and 4 secured to the rear end of the matrix. Then each support arm 21, 22, 23, and 23 of the cruciform engaging member 25 of the rear fastening and fixing means 25 is abutted against the outer end surface of the joint fittings B while the engaging arms 26 and 27 hold and embrace the

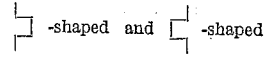

reinforcing members 3 and 4 so that the rear closure plate 18 comes into the female joint fittings B with a clearance H as high as the distance pieces 19 and 20, under the actuation of the fastening and fixing means 21, in which case by turning the clamping or fastening rod 29 of the rear closure plate 18 is fixed securely by pressing of the tip end of said fastening rod 29 against the surface of the cruciform engaging member. The aforesaid depth H will have a depth sufficient for the front male joint male joint fitting. A of one concrete member 58 to be engaged in the rear female joint fittings B of other concrete member 58 by insertion from behind, and is variable and not constant, but generally from about one-fourth to three-fifths of the height of the female joint fittings B. 57 is a top opening of the matrix, from which is charged the prepared concrete by the normal way. The paste of the filled-in concrete partly leaks out from the clearances in the front and rear portions as already set forth hereinbefore, and there is obtained the concrete member fitted solidly with the male joint fitting A and the female joint fitting B. Furthermore, in the case where such male and female joint fittings as described above are not used, the prepared concrete is charged in the air space between the front closure plate and the rear closure plate, which are respectively positioned fixedly and there is obtained the concrete member without male and female joint fittings.

As heretofore described, the apparatus of molding flasks according to this invention is very simple and easy to assemble and disassemble since there are effectively provided with suitable clearances at both open ends of the matrix of

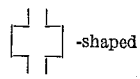 -shaped cross section so that by inserting the front and rear closure plates of cruciform flat irons loosely and capably to be removed readily from the molding flasks, it is possible to heighten the efficiency of manufacture, while at the same time it is possible to promote the hardening of concrete by carrying out the premature air curing of the filled concrete, and to obtain a strong and tough and moreover, very cheap concrete members, especially concrete members fitted with male joint fittings, and female joint fittings at both front and rear of the matrix.

What I claim is:

1. An apparatus of molding flasks for manufacturing concrete members of cruciform cross section, which comprises an assembled molding flask of

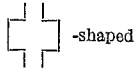 -shaped cross section constituted by arranging a molding flask of

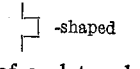 -shaped cross section formed of a plate selected from the group consisting of a thin sheet iron plate and a synthetic resin plate and a molding flask of

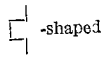 -shaped cross section formed similarly of a plate selected from the group consisting of a thin sheet iron plate and a synthetic resin plate, in opposite and in parallel in spaced relations with each other; a bottom plate disposed in horizontal and having the desired width, thickness and length, the plate being at its both sides tightly fastened together with the bottom portions of the said

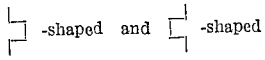 -shaped and -shaped molding flasks respectively by means of clamping devices to form a matrix of

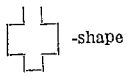 -shape and front and rear closure plates of cruciform sheet iron plates each slightly smaller in shape than the configuration along the inner periphery of both front and rear open ends of the matrix, the closure plates respectively being positioned fixedly inside of the both front and rear open ends of the matrix by means of a front fastening and fixing device and a rear fastening and fixing means respectively.

2. An apparatus of molding flasks as defined in claim 1, which comprises an assembled molding flask of

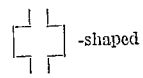 -shaped cross section constituted by a molding flask of

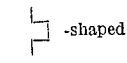 -shaped cross section formed of a plate selected from the group consisting of a thin sheet iron plate and a synthetic resin plate and a molding flask of

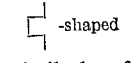 -shaped cross section formed similarly of a plate selected from the group consisting of a thin sheet iron plate and a synthetic resin plate; a wooden bottom plate disposed in horizontal and having the desired width, thickness and length, the wooden plate being at its both sides tightly fastened together with the bottom portions of the said

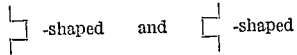 -shaped and -shaped molding flasks respectively by means of clamping devices to form a matrix of

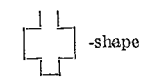 -shape male joint fittings of

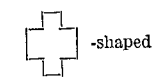 -shaped cross section; female joint fitting of

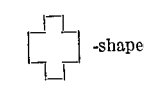 -shaped cross section, both joint fittings respectively being fitted in the front open end of the matrix and fitted in holdering means secured to the outside of the rear open end of the matrix; and front and rear closure plates of cruciform sheet iron plates each slightly smaller in shape than the configuration along the inner peripheral surface of both front and rear open ends of the matrix; these closure plates respectively being positioned fixedly on and inside of the outer end surface of the male and female joint fittings by means of a front fastening and fixing device and a rear fastening and fixing means respectively.

3. An apparatus of molding flasks as defined in claim 1, wherein said bottom plate is formed of wood.

4. An apparatus of molding flasks as defined in claim 1, wherein each bottom portion of the

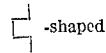 -shaped molding flask and

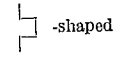 -shaped molding flask of

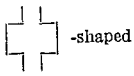 -shaped assembled molding flasks is formed in vertical shape respectively.

5. An apparatus of molding flasks as defined in claim 1, wherein bottom portions of the molding flasks respectively are abutted against both sides of the wooden bottom plate and fastened together tightly by means of clamping devices from outside, thereby the said bottom portions are tightly pressed against both sides of the wooden bottom plate.

6. An apparatus of molding flasks as defined in claim 1, wherein a front closure plate of cruciform sheet iron plate slightly smaller in shape than the configuration along the inner peripheral surface of the front open end of the matrix is positioned fixedly on the outer end surface of the male joint fittings with aid of a front fastening and fixing device; and a rear closure plate of cruciform sheet iron plate slightly smaller in shape than the inner peripheral surface of the rear end of the matrix is also positioned fixedly inside of the outer end surface of the female joint fittings with aid of a rear fastening and fixing means in an inward depth of H corresponding to the height of distance pieces welded to the surface of the said closure plate.

7. An apparatus of molding flasks as defined in claim 2, wherein male joint fittings formed into a

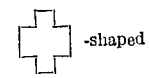 -shaped cross section by welding four profiles of ⊐-shaped cross section together integrally and female joint fittings formed into a

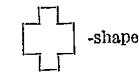 -shape cross section by welding four profiles of ⊐-shaped cross section together integrally are respectively fitted in the front open end of the matrix of

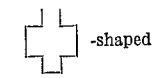 -shaped cross section and in the holding means secured to the outside of the rear open end of the said matrix, these both joint fittings being connected with each other by longitudinally extending steel bars arranged with spiral hoop small bar; a front closure plate of cruciform sheet iron plate slightly smaller in shape than the configuration along the inner peripheral surface of the said

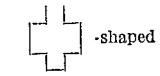 -shaped matrix is positioned fixedly on the outer end surface of the said fittings with aid of a front fastening and fixing device; and a rear closure plate of cruciform sheet iron plate slightly smaller in shape than the inner peripheral surface of the 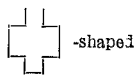-shaped matrix is also positioned fixedly inside of the outer end surface of the said fittings with aid of a rear fastening and fixing means in an inward depth of H corresponding to the height of distance pieces welded to the surface of the said closure plate.

8. An apparatus of molding flasks as defined in claim 1, wherein the front fastening and fixing device for positioning fixedly the front closure plate comprises left and right holders respectively secured to both sides of the fastening and fixing device body itself; and a bolt.

9. An apparatus of molding flasks as defined in claim 1, wherein the rear fastening and fixing means for positioning fixedly the rear closure plate comprises a cruciform engaging member connected with the rear closure plate through distance pieces; left and right engaging members of the fastening and fixing means body itself; and a fastening rod.

10. An apparatus of molding flasks as defined in claim 1, wherein clearances between the inner peripheral surface of the both front and rear open ends of the matrix and the outer periphery of the front and rear closure plates respectively positioned fixedly inside of the said front and rear open ends of the matrix are respectively about 2 to 4 mm., preferably 2.5 to 3 mm.

11. An apparatus of molding flasks as defined in claim 2, wherein, a clearance α is provided between the inner peripheral surface of the matrix and the outer periphery of the front closure plate in engagement with the male joint fittings on its outer end surface and a clearance β is provided between the inner peripheral surface of the female joint fittings and the outer periphery of the rear closure plate positioned fixedly in the female joint fittings, these clearance α and β being respectively about 2 to 4 mm.

References Cited
UNITED STATES PATENTS

| | | | |
|---|---|---|---|
| 1,495,522 | 5/1924 | Lo Forti | 249—165 X |
| 2,771,656 | 11/1926 | Swenson | 249—50 |

FOREIGN PATENTS 587,717  5/1947  Great Britain.

J. SPENCER OVERHOLSER, Primary Examiner.